United States Patent Office 3,042,610
Patented July 3, 1962

3,042,610
ACIDIZING OF WELLS
Peggy M. Dunlap, Dallas, Tex., assignor, by mesne assignments, to Socony Mobil Oil Company, Inc., New York, N.Y., a corporation of New York
No Drawing. Filed Mar. 4, 1959, Ser. No. 797,048
3 Claims. (Cl. 252—8.55)

This invention relates to acidizing of wells and relates more particularly to reducing the reaction rate of the acid employed for acidizing wells.

Petroleum oil is produced from a petroleum-containing subterranean formation by flow of the oil from the formation to a well bore hole drilled from the surface of the earth to the formation. Flow of oil from the formation to the well bore hole depends, among other factors, upon the degree of permeability of the formation. Often, the permeability is not sufficiently great to permit a desired rate of flow of the oil. In such case, the formation can be treated to increase its permeability. One method of increasing permeability involves contacting the formation at the well bore hole with a solution of hydrochloric acid and forcing the acid solution into the formation. By this procedure, limestone or dolomite in the formation is dissolved with the result that pores or voids are created within the formation. The acid has a high reaction rate. Accordingly, upon being forced into a formation, the acid rapidly dissolves the limestone or dolomite with which it comes into contact. As a result, the acid dissolves a larger portion of the dolomite or limestone in the immediate vicinity of the well bore hole than is necessary and the acid becomes spent before it has penetrated to any great distance from the bore hole into the formation. It has, therefore, become the practice to add to the acid an agent for reducing the reaction rate of the acid in order that a greater areal extent of effective acid treatment can be achieved. However, these agents, while effective for the purposes intended, leave much to be desired in the extent to which they retard the action of the acid.

It is an object of this invention to acidize a well. It is another object of this invention to increase the areal extent of effective acid treatment of a well. It is another object of this invention to provide a composition for acidizing wells. It is another object of this invention to retard the reaction rate of acid compositions. It is another object of this invention to improve the effectiveness of agents for retarding the reaction rates of acid compositions in wells. Further objects of the invention will become apparent from the following detailed description.

In accordance with the invention, in the acidizing of wells, there is provided a composition comprising an aqueous solution of acid, particularly hydrochloric acid, containing dissolved therein a water-soluble salt of calcium and a water-soluble organic compound possessing surface-active properties. In a preferred embodiment of the invention, the water-soluble organic compound possessing surface-active properties has the formula R—K, where R is a hydrophobic group and K is a group selected from the class consisting of a polar group containing nitrogen and a group containing ethylene oxide.

The water-soluble salt of calcium dissolved in the acid retards the rate of reaction of the acid upon limestone and dolomite. The water-soluble organic compound dissolved in the acid also retards the rate of reaction of the acid upon these earth materials. However, the effects of the water-soluble salt of calcium and the water-soluble organic compound assist and supplement each other to the extent that retardation of the reaction rate of the acid by both compounds is greater than the sum of the retardation of the reaction rate by each of the compounds. Accordingly, a high degree of retardation of reaction rate is obtained and the acid can penetrate to greater distances into the formation from the well bore hole before becoming spent.

The hydrochloric acid employed may be any of the types of hydrochloric acid ordinarily employed for acidizing wells. The concentration of hydrogen chloride in the acid solutions commonly employed is 15 percent by weight. However, greater or lesser concentrations of hydrogen chloride in the acid solution can be employed if desired. The acid solution may also contain various additives employed for specific purposes. Thus, for example, the acid may contain any of various inhibitors to minimize the corrosive action of the acid upon the metal equipment it contacts in the well or may contain additives to control emulsification. In connection with the use of inhibitors to minimize the corrosive action of the acid upon metal equipment, the water-soluble salt of calcium and the water-soluble organic compound possessing surface-active properties decrease the corrosive action of the acid. Thus, where additional inhibitors are desired, the amount employed may be minimized.

The water-soluble salt of calcium can be any of the water-soluble salts of calcium. Included among these salts are calcium chloride, calcium nitrate, calcium acetate, and calcium bromide. Preferably, calcium chloride is employed.

The water-soluble calcium salt, in any concentration in the hydrochloric acid, will effect a degree of retardation of the reaction rate of the acid. However, the water-soluble salt should be employed in a concentration of at least 2.8 molar. Preferably, however, the concentration of the water-soluble salt should be about 3.0 molar. The maximum concentration to be employed can be as desired. However, with greatly increased concentrations of the water-soluble salt of calcium, the viscosity of the acid solution becomes higher than would be desired for ease of handling and injection into the formation. Further, the cost of the composition becomes economically undesirable. Also, the degree of retardation of the reaction rate of the hydrochloric acid becomes less with unit increase in the amount of salt as the concentration of the water-soluble salt increases. Preferably, the concentration of the water-soluble salt of calcium should not be in excess of about 3.5 molar. Employing calcium chloride as the water-soluble calcium salt, 2.8 molar concentration will be equivalent to about 34 percent by weight of the hydrogen chloride and water in the solution, or about 25 percent by weight of the total solution, and 3.5 molar concentration will be equivalent to about 43 percent by weight of the hydrogen chloride and water in the solution, or about 30 percent by weight of the total solution.

The presence of the water-soluble calcium salt in the hydrochloric acid solution serves to decrease the solubility of calcium sulfate, i.e., anhydrite or gypsum, in the acid solution. Calcium sulfate, present in the earth formations treated by the acid solution, is soluble in fresh hydrochloric acid solutions. However, the calcium sulfate becomes less soluble as the hydrogen ion concentration decreases. As a result, as the acid becomes spent, the calcium sulfate which was dissolved in the fresh acid precipitates from the solution. The suspended calcium sulfate can block or plug permeable formations penetrated by the acid. Water-soluble calcium salts have heretofore been employed in the aqueous hydrochloric acid solution to decrease, by the common ion effect, the solubility of the calcium sulfate in the fresh acid solution. Thus, the extent to which the calcium sulfate is dissolved in the acid solution, and the amount which can precipitate from the solution, is decreased. With the concentrations, mentioned above, of water-soluble calcium salt in the aqueous acid solution, not only is effective retardation of the reaction rate of the acid obtained, but particularly effective decrease in the solubility of calcium sulfate in the fresh acid is also obtained.

The water-soluble organic compound can be any such compound possessing surface-active properties. By compound possessing surface-active properties, I mean a compound which has the property of reducing the surface tension of water and adsorbing on a surface such as that of a solid or distributing itself at the interface between two liquid phases. In the preferred embodiment of the invention, the compound must also be one wherein the R group is a hydrophobic group. Further, in the preferred embodiment of the invention, the compound must be one in which K is a group selected from the class consisting of a polar group containing nitrogen and a group containing ethylene oxide.

The R group in the water-soluble organic compound imparts hydrophobic properties to the compound. The K group, being either a polar group containing nitrogen or a group containing ethylene oxide, imparts hydrophilic properties to the compound. The compound, as stated, however, must be water soluble. Accordingly, the K group must be one which is sufficiently hydrophilic to overcome the effect of the R group imparting a hydrophobic property so that the compound as a whole is more hydrophilic than hydrophobic.

It is preferred that the R group in the water-soluble inorganic compound be a hydrocarbon group. However, the group is not limited to a structure of only carbon and hydrogen atoms and may contain other atoms. On the other hand, the R group regardless of constitution must remain predominantly hydrophobic.

The K group may be, as indicated, a polar group containing nitrogen. This may be any polar group containing nitrogen provided that it is sufficiently hydrophilic to overcome the hydrophobic properties of the R group and render the organic compound water soluble. Thus, this group may contain hydrocarbon groups provided that they do not overcome the hydrophilic property of the group. The polar group containing nitrogen may be a quaternary ammonium group. The other valences of the quaternary ammonium group may be satisfied with organic groups within the limitations indicated. The polar group containing nitrogen may also be an amine group.

The K group may also be a group containing ethylene oxide. Preferably, the K group should contain at least five mols of ethylene oxide. It may also contain any number of ethylene oxide groups in excess of five.

Particularly preferred for use in the invention are compounds having both a group containing nitrogen and a group containing at least five mols of ethylene oxide.

The following water-soluble compounds possessing surface-active properties have been found satisfactory for use in the invention:

(A) Polyoxyethylene ether of Rosin Amine D (dehydroabietyl amine).

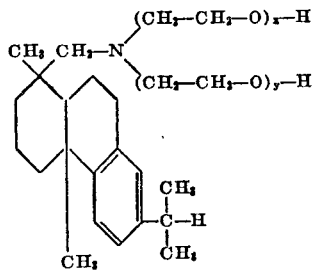

where $x$ and $y$ are whole numbers and their sum is at least as great as five.

(B) Cocotrimethyl ammonium chloride.

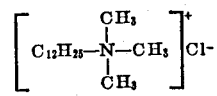

In cocotrimethyl ammonium chloride, the "coco" group is not a group containing a specific number of carbon atoms but is a number of individual groups containing different numbers of carbon atoms. However, the $C_{12}H_{25}$— group is in greater amount than any other group.

(C) Di-n-butyl amine.

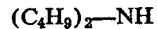

(D) Polyoxyethylene ether of nonyl phenol.

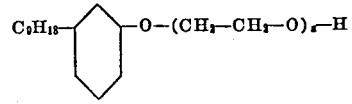

wherein $z$ is a whole number, preferably at least as great as five.

(E) Polyoxyethylene ether of dodecyl phenol.

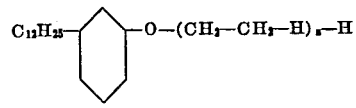

where $z$ is a whole number at least as great as ten.

(F) Polyethylamine aniline.

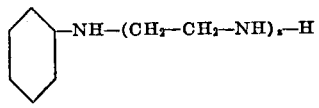

where $z$ is a whole number, preferably at least as great as five.

(G) Propyl pyridine.
(H) Butyl pyridine.
(I) Amyl pyridine.

The water-soluble organic compound having surface-active properties, similar to the water-soluble calcium salt, in any concentration will effect a degree of retardation of the reaction rate of the acid. However, it is preferred that the water-soluble organic compound be employed in a concentration of at least 0.1 percent by weight of the aqueous hydrochloric acid. Preferably, the concentration of the water-soluble organic compound should be about 1.0 percent by weight of the aqueous acid. Concentrations of about 4 percent may be employed. Higher concentrations may be employed, if desired.

The examples following will be further illustrative of the invention.

In these examples, the effect on reaction rate of aqueous hydrochloric acid of water-soluble calcium salt and various water-soluble organic compounds possessing surface-active properties was determined. In each example, a 100 milliliter portion of aqueous solution containing 15 weight percent of hydrogen chloride was placed in a glass container. To each acid solution, but two, was added calcium chloride in the amount of 37.5 percent by weight of the hydrogen chloride and water, or 3.0 molar. To each of these latter solutions, but one, and to one of the solutions to which the calcium chloride was not added, was added a water-soluble organic compound having surface-active properties. Into each container was placed a calcite (calcium carbonate) crystal and the crystal was completely immersed in the solution. The crystal was coated with paraffin except for one face having an area of three square centimeters whereby the calcite surface area exposed to the acid was maintained constant. A magnetized bar coated with plastic was placed in each container and was spun at 1300 revolutions per minute for a period of at least thirty minutes. During this time, the solutions were maintained at a temperature of 80° F. and at atmospheric pressure. At the end of the stirring period, the crystal was removed and the concentration of acid in each solution was measured by titrating with potassium hydroxide solution employing phenolphthalein indicator. From the change in the acid concentrations from the initial 15 percent, the rate of reaction of the acid solutions was calculated.

The table following gives the example numbers, the compositions of the solutions, and the relative reaction rates of the solutions. The table also gives, for each of the solutions containing water-soluble organic compound possessing surface-active properties, the calculated relative reaction rate obtained by multiplying the observed relative reaction rate by the relative reaction rate of the solution containing only hydrochloric acid and calcium chloride. This rate is the rate that would be expected taking into consideration the effect, individually, of the calcium chloride and of the water-soluble organic compound upon the reaction rate of the acid.

In the table, the relative reaction rate is the rate relative to the rate of the acid solution alone on the calcite crystal. The reaction rate for the acid solution is taken as unity. Further, the relative reaction rates are relative specific velocity constants, with the constant for the acid alone taken as unity. The reaction between the hydrochloric acid and the solid calcium carbonate is a first order reaction with respect to the acid concentration. Thus, the reaction rate, $$\frac{d(H^+)}{dt}$$

is proportional to the acid concentration, $H^+$, and the projected area, S, of the calcium carbonate exposed to the acid. The specific velocity constant, $k$, is indicated by the equation $$\frac{d(H^+)}{dt} = -k(H^+)S$$

This equation holds at specified conditions of temperature, pressure, and agitation. Integration of the equation yields $$k = \frac{2.303}{S} \frac{\log (H^+)_1 - \log (H^+)_2}{(t_2 - t_1)}$$

soluble organic compound possessing surface-active properties, the relative reaction rate was less than that of either the acid solution containing water-soluble calcium salt or the acid solution containing water-soluble organic compound possessing surface-active properties. It will be further observed that the relative reaction rate of each acid solution containing water-soluble calcium salt and water-soluble organic compound possessing surface-active properties was lower than the relative reaction rate obtained by multiplying the relative reaction rate of the acid solution containing the water-soluble calcium salt by the relative reaction rate of the acid solution containing the water-soluble organic compound possessing surface-active properties. In this connection, it will be noted that the lowest relative reaction rate was obtained by employing calcium chloride and ethylene oxide ether of Rosin Amine D containing five mols of ethylene oxide.

While the invention has been described particularly in connection with the use of hydrochloric acid, other acids may be employed and their reaction rates will be decreased by the water-soluble calcium salt and the water-soluble organic compound possessing surface-active properties. Included among these acids are nitric acid, hydrobromic acid, formic acid, acetic acid, hydroxyacetic acid, chloracetic acid, dichloracetic acid, trichloracetic acid, and sulfamic acid.

Having thus described by invention, it will be understood that such description has been given by way of illustration and example, and not by way of limitation, reference for the latter purpose being had to the accompanying claims.

I claim:

1. In a method of treating a well, the step which comprises introducing into said well a composition comprising an aqueous solution of acid containing dissolved therein in a concentration between about 2.8 and about 3.5 molar a water-soluble salt of calcium and in a concentration of at least 0.1 percent by weight of said aqueous solution of acid a water-soluble organic compound possessing surface-active properties and being selected from the group consisting of polyoxyethylene ether of dehydroabietyl amine, cocotrimethyl ammonium chloride, di- Table

| Example | Composition | Rate Observed | Rate Calculated |
|---|---|---|---|
| 1 | HCl+H₂O | 1 | |
| 2 | HCl+H₂O+CaCl₂ | 0.455 | |
| 3 | Ethylene Oxide Ether of Rosin Amine D (x+y=5)+HCl+H₂O | .52 | |
| 4 | Ethylene Oxide Ether of Rosin Amine D (x+y=5)+HCl+H₂O+CaCl₂ | .07 | .24 |
| 5 | Ethylene Oxide Ether of Rosin Amine D (x+y=5)+HCl+H₂O+15% by weight of Rosin Amine D | .62 | |
| 6 | Ethylene Oxide Ether of Rosin Amine D (x+y=5)+HCl+H₂O+15% by weight of Rosin Amine D + CaCl₂ | .12 | .28 |
| 7 | Ethylene Oxide Ether of Rosin Amine D (x+y=11)+HCl+H₂O | .71 | |
| 8 | Ethylene Oxide Ether of Rosin Amine D (x+y=11)+HCl+H₂O+CaCl₂ | .12 | .32 |
| 9 | Ethylene Oxide Ether of Rosin Amine D (x+y=11)+HCl+H₂O+10% by weight of Rosin Amine D | .55 | |
| 10 | Ethylene Oxide Ether of Rosin Amine D (x+y=11)+HCl+H₂O+10% by weight of Rosin Amine D + CaCl₂ | .17 | .25 |
| 11 | Ethylene Oxide Ether of Rosin Amine D (x+y=55)+HCl+H₂O+1% by weight of Rosin Amine D | .54 | |
| 12 | Ethylene Oxide Ether of Rosin Amine D (x+y=55)+HCl+H₂O+1% by weight of Rosin Amine D + CaCl₂ | .14 | .25 |
| 13 | Mixture of Propyl, Butyl, and Amyl Pyridine + HCl+H₂O | .73 | |
| 14 | Mixture of Propyl, Butyl, and Amyl Pyridine+HCl+H₂O+CaCl₂ | .31 | .33 |
| 15 | Cocotrimethyl Ammonium Chloride+HCl+H₂O | .62 | |
| 16 | Cocotrimethyl Ammonium Chloride+HCl+H₂O+CaCl₂ | .15 | .24 |
| 17 | Ethylene Oxide Ether of Nonyl Phenol (z=6)+HCl+H₂O | .50 | |
| 18 | Ethylene Oxide Ether of Nonyl Phenol (z=6)+HCl+H₂O+CaCl₂ | .18 | .25 |
| 19 | Ethylene Oxide Ether of Nonyl Phenol (z=9)+HCl+H₂O | .55 | |
| 20 | Ethylene Oxide Ether of Nonyl Phenol (z=9)+HCl+H₂O+CaCl₂ | .16 | .23 |
| 21 | Ethylene Oxide Ether of Nonyl Phenol (z=10)+HCl+H₂O | .35 | |
| 22 | Ethylene Oxide Ether of Nonyl Phenol (z=10)+HCl+H₂O+CaCl₂ | .15 | .16 |
| 23 | Ethylene Oxide Ether of Dodecyl Phenol (z=11.5)+HCl+H₂O | .69 | |
| 24 | Ethylene Oxide Ether of Dodecyl Phenol (z=11.5)+HCl+H₂O+CaCl₂ | .18 | .31 |
| 25 | Ethylene Oxide Ether of Dodecyl Phenol (z=18)+HCl+H₂O | .68 | |
| 26 | Ethylene Oxide Ether of Dodecyl Phenol (z=18)+HCl+H₂O+CaCl₂ | .24 | .31 |
| 27 | Ethylene Oxide Ether of Dodecyl Phenol (z=34)+HCl+H₂O | .65 | |
| 28 | Ethylene Oxide Ether of Dodecyl Phenol (z=34)+HCl+H₂O+CaCl₂ | .17 | .30 |

It will be observed from the table that the relative reaction rates were decreased for each acid solution containing water-soluble calcium salt and water-soluble organic compound possessing surface-active properties. It will also be observed from the table that, for each acid solution containing water-soluble calcium salt and watern-butyl amine, polyoxyethylene ether of nonyl phenol, polyoxyethylene ether of dodecyl phenol, polyethylamine aniline, propyl pyridine, butyl pyridine, and amyl pyridine.

2. The method of claim 1 wherein said water-soluble organic compound possessing surface-active properties is polyoxyethylene ether of dehydroabietyl amine containing at least five mols of ethylene oxide.

3. The method of claim 1 wherein said acid is hydrochloric acid, said water-soluble salt is calcium chloride and said water-soluble organic compound possessing surface-active properties is polyoxyethylene ether of dehydroabietyl amine containing at least five mols of ethylene oxide.

References Cited in the file of this patent

UNITED STATES PATENTS

| | | |
|---|---|---|
| 2,232,938 | Chamberlain | Feb. 23, 1941 |
| 2,265,759 | Lawton et al. | Dec. 9, 1941 |
| 2,278,838 | De Groote et al. | Apr. 7, 1942 |
| 2,281,419 | De Groote et al. | Apr. 28, 1942 |
| 2,564,758 | Haggard | Aug. 21, 1951 |
| 2,717,876 | Menaul | Sept. 13, 1955 |
| 2,778,427 | Cardwell et al. | Jan. 22, 1957 |
| 2,841,222 | Smith | July 1, 1958 |

OTHER REFERENCES

Gryzen: Retarded Acid Is Successful in Alberta-Article in World Oil, March 1957, pages 154, 156 and 158.

UNITED STATES PATENT OFFICE
CERTIFICATE OF CORRECTION

Patent No. 3,042,610                      July 3, 1962

Peggy M. Dunlap

It is hereby certified that error appears in the above numbered patent requiring correction and that the said Letters Patent should read as corrected below.

Column 4, lines 16 to 20, the formula should appear as shown below instead of as in the patent:

same column, lines 24 to 28, the formula should appear as shown below instead of as in the patent:

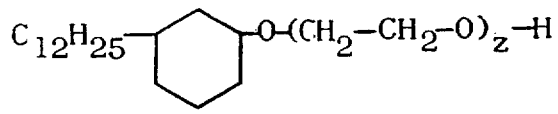

columns 5 and 6, in the table, second column, in the listing of the composition under Example 12, for "Ethulene" read -- Ethylene --; column 6, line 27, for "by" read -- my --.

Signed and sealed this 13th day of November 1962.

(SEAL)
Attest:
ERNEST W. SWIDER
Attesting Officer

DAVID L. LADD
Commissioner of Patents